May 2, 1967 K. GREIS ETAL 3,316,791
METAL SHEARS HAVING A STRAIGHT AND A CURVED KNIFE
Filed Dec. 4, 1964 4 Sheets-Sheet 4
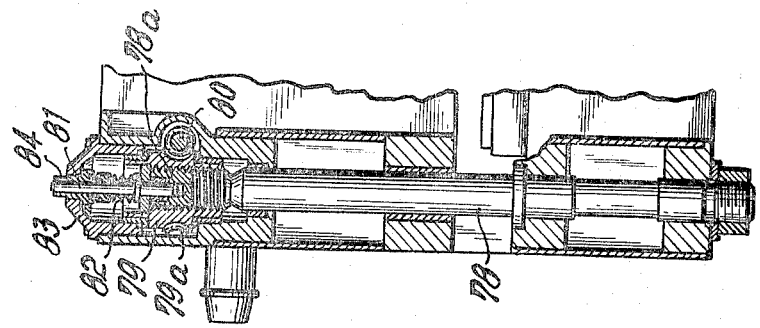
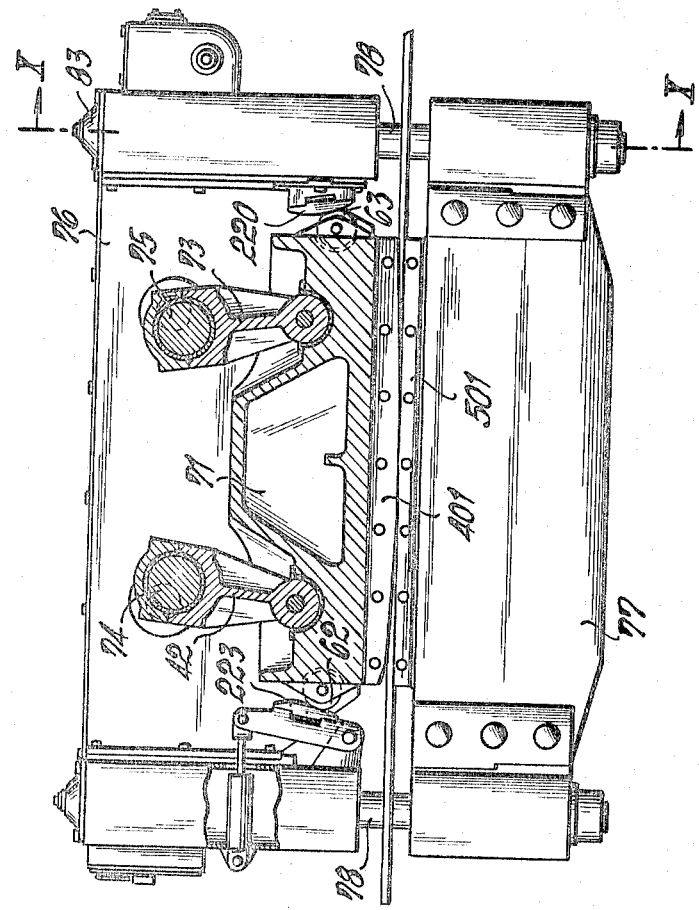

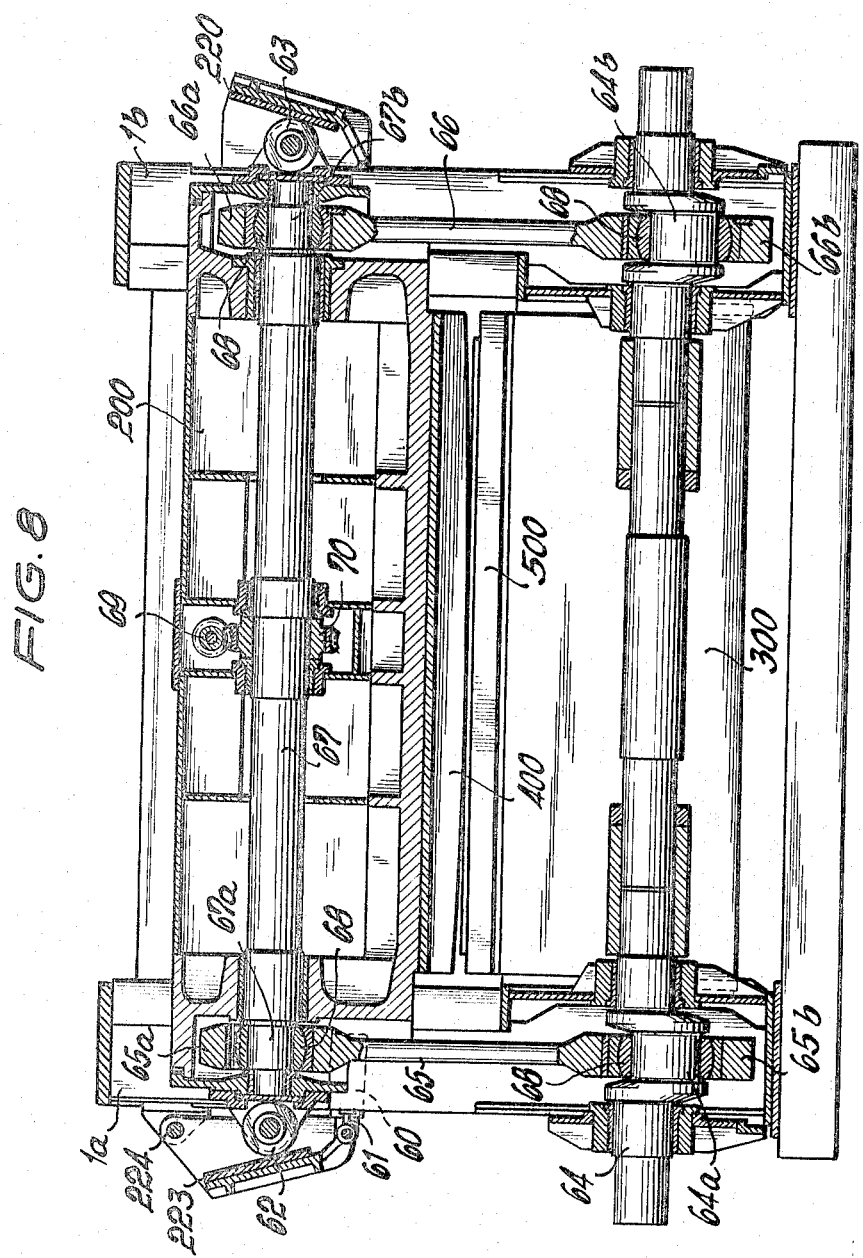

United States Patent Office 3,316,791
Patented May 2, 1967

3,316,791
METAL SHEARS HAVING A STRAIGHT AND A CURVED KNIFE
Karl Greis and Paul Hamacher, St. Ingbert, Saar, Germany, assignors to Verwaltungsgesellschaft Moeller und Neumann offene Handelsgesellschaft, St. Ingbert, Saar, Germany
Filed Dec. 4, 1964, Ser. No. 415,901
Claims priority, application Germany, Dec. 5, 1963, V 24,982
9 Claims. (Cl. 83—566)

The invention relates to shears which are especially suitable for cutting thick and medium-thick metal sheets and which have a straight and a curved knife, the curved knife carrying out a cradle movement. A cradle cut with a curved knife requires a small or even no overlap of the knives during cutting, which has a favorable effect on the cut sheet edges. In cutting or dividing metal plates this makes it possible to obtain straight sheets instead of curved sheets.

In spite of these apparent advantages cradle shears with straight knives are preferred to the long-known cradle shears having a curved knife, especially in the use on shearing lines for rolling tracks in rolling mills on which sheet thicknesses of about 5 mm. up to thicknesses of 40 mm. are handled. The reason for this is a prejudice which exists against cradle shears with a curved knife based on the knowledge expressed in the art that such shears are only suitable for very specific sheet thicknesses. This is quite true for the known cradle shears having a curved knife and a stationary straight knife because when the cradle movement of the curved knife relative to the stationary back-up knife is adapted to a specific sheet thickness, the cutting conditions change for the worse if used for other sheet thicknesses. In fact it has to be expected that for the very thick sheets the curved knife cuts no longer at a sheet edge but meets the sheet surface frontally. In the known shears construction having a curved knife the cutting drives which engage at the ends of the movable knife support are so coupled together that the knife stroke and the cradle movement are always the same relative to the stationary straight knife.

According to the invention the old construction of metal shears having a curved knife carrying out a cradle movement is improved with the object of making it usable for all existing sheet thicknesses of a thick-sheet shearing line and to thereby overcome the existing prejudice against these shears.

A solution resides in the fact that the knife support of the straight back-up knife is made adjustable to different levels, which is known in shears without cradle cut having only straight knives for the purpose of not exposing the roller track to a cutting pressure or to eliminate the necessity of making the roller track as a rocking support. This invention employs the height adjustment of the straight knife for the purpose of moving the back-up knife far enough away from the curved knife which has actually a fixed stroke and cradle movement, that also in the case of thick sheets normal cutting movements are produced with respect to the cutting angle and knife overlap. In the case of large thicknesses the cutting knife needs to penetrate only partly into the sheet thickness because the remainder of the thickness will break away thereafter in a straight extension of the cutting direction if the knife gap is properly set. The invention makes it possible in view of the height adjustment of the straight back-up knife to adjust these cutting conditions depending on the sheet thicknesses, and one obtains by using a curved knife a "negative" knife overlap which extends over the entire sheet width, that is to say the knives no longer need to touch at all.

The same improvement may be obtained according to the invention with a second solution of this problem by starting from metal shears having a stationary straight knife and a curved knife movable in a cradle motion, and by determining that the cutting drives of the curved knife are adjustable as a whole to different levels in order to be able to employ the curved knife for any sheet thickness to be handled with a most favorable negative knife overlap, to obtain a maximum knife opening, and to make metal shears having a curved cradling knife usable in its application area independently of the sheet thicknesses. In consideration of the two above stated solutions the principle resides in providing on metal shears having a straight and a curved knife an arrangement for changing the gap of the knives independently of the effective cutting stroke of the curved knife.

In view of obtaining the least possible deformation of the sheet edges during the cutting operation it is desirable that the curved cutting knife penetrates to an equal depth over the entire sheet width. In other words the cutting edge is to roll off uniformly on an imaginary horizontal line.

It is an object of this invention to provide a positive control for the rolling movement of the cutting edge of the curved knife in order to obviate also the danger that the curved knife would exert in a horizontal direction to such an extent a pulling or pressing effect on the sheet that the sheet or the knife would slide away laterally. For this reason the invention provides for both solutions described above that the knife support of the curved knife is guided on one side in an inclined rigid guide and on the other side in a guide which is arranged pivotably on the frame, wherein the inclined rigid guide corresponds approximately to a cycloid which describes the positively guided part of the knife support under the condition that the curved knife rolls off during the cutting movement on an imaginary horizontal line.

For further details concerning this positive guiding of the one knife support on one side as well as additional inventive features may be derived from the accompanying drawings and from the following description of which as examples one shear is illustrated as cutting from below and two from above. In the drawing:

FIG. 8 shows shears cutting from above with a drive of the upper knife from a subjacent crank shaft, in longitudinal section.

FIG. 9 shows shears with a drive of the upper knife support over two pressure rams, partly in section and partly in end view, and FIG. 10 shows a cross-section along line IX—IX in FIG. 9 on a larger scale.

Figure 1:
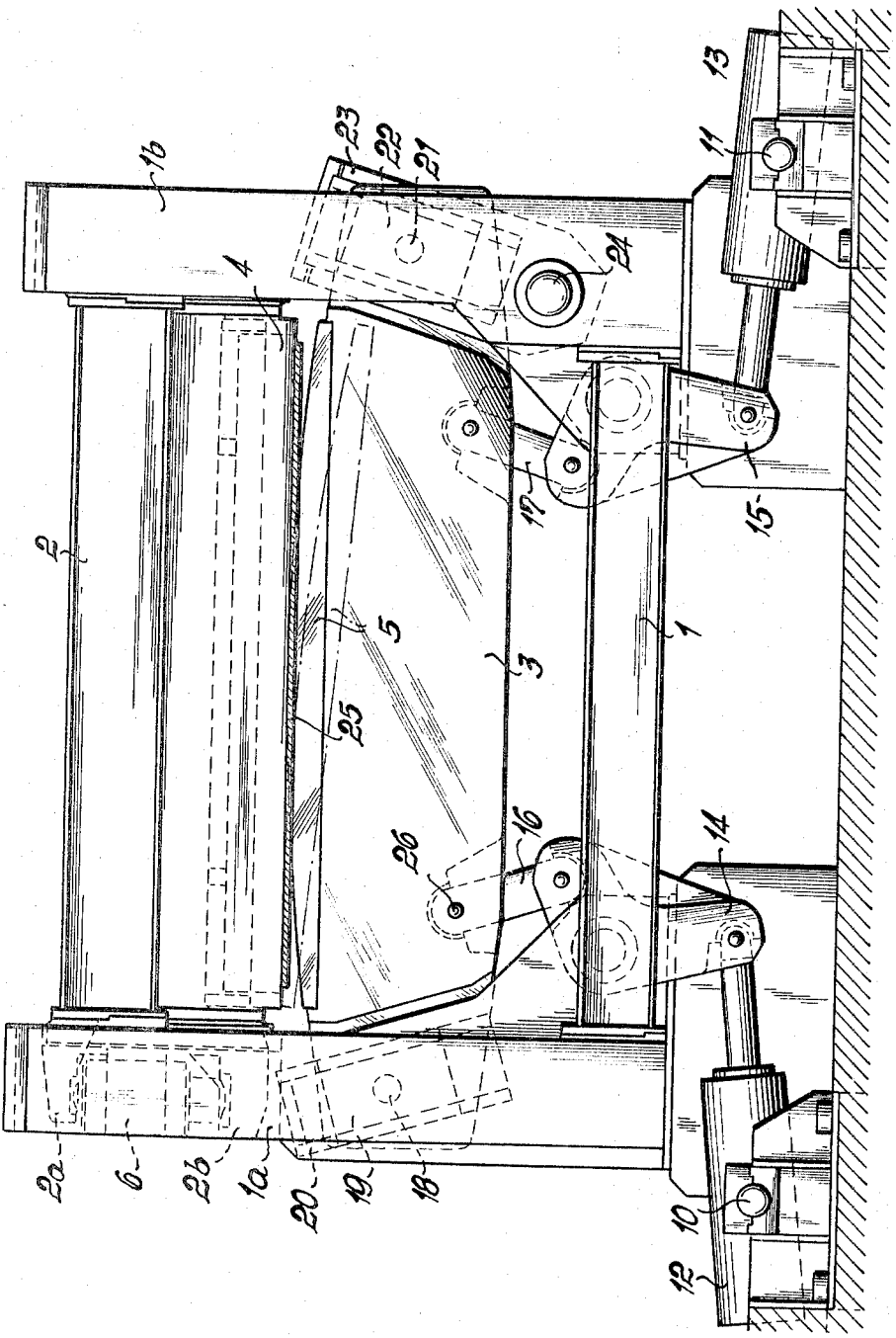
FIG. 1 shows hydraulic shears cutting from below, in an end view.

With reference to the drawing the shears according to FIGURE 1 consist of a frame 1 in which the upper knife support 2 as well as the lower knife support 3 are movably guided. The upper knife support 2 has a straight upper knife 4 extending horizontally and the lower knife support 3 has a curved lower knife 5 of arcuate shape. For the purpose of adjusting the upper knife 4 cylinder units 6 and 7 are inserted into the columns 1a and 1b of the frame 1 as may be seen more clearly in FIGURE 2. The cylinder units 6 and 7 comprise pistons 8 and 9 which are coaxially movable in separate pressure chambers which may be supplied alternately with pressure oil and may be valved for return flow. The pistons 8 and 9 are fixed at their end faces to extension arms 2a and 2b of the upper knife support 2 and each comprises a cylinder unit 6 and 7 between them.

To carry out a cut the knife support 3 for the curved lower knife 5 is driven by two horizontally disposed hydraulic adjusting motors 12, 13 which are pivotally mounted at 10 and 11, the motors operating over angle levers 14, 15 and pressure rams 16, 17. Accordingly the cutting drives engage at both ends of the knife support 3. This support is positively guided on one side in column 1a of the shears frame 1 over a pivot pin 18 and sliding blocks 19 in a guide 20 which extends in the direction of the cutting movement with an outward slant. At the other side the knife support 3 is mounted in column 1b over pivot pins 21 and slide blocks 22 in a guide 23 which is pivotably mounted at 24 on the frame 1. The slanted guide 20 on one side of the knife support 3 has the following significance. In FIGURE 1 the knife support 3 or the curved lower knife 5 is located exactly in the symmetrical center position, that is in the position where the center of the cutting edge of the lower knife 5 has reached its highest point during the cradle cut. In order to finish the cut of the sheet 25 pressed against the upper knife 4 on the piece facing the guide 20 the knife support is raised slower on the left side than it is lowered on the right side by the cutting drive 13, 15 and 17. These differential speed relations are provided by the dimensions of the crank gears in the cutting drive and it is assumed that the cutting edge of the curved lower knife 5 rolls off for example on the horizontal line illustrated by the cutting edge of the straight upper knife, the pivot pin 18 moves on a cycloid, and in particular on a shortened (stretched) cycloid, because it is located inside the rolling circle. The inclined guide moves according to the invention approximately in a corresponding cycloid.

The stroke and cradle movement of the lower knife 5 is always the same although in the shears of the invention it is possible to work also with an oscillating cut, that is to say from right to left and from left to right.

In view of the height adjustment of the straight upper knife 4 it is obtained that during the cutting of a thicker sheet than that of the sheet 25 shown in the drawing the upper knife 4 is simply set to a higher level. Even with an equal stroke of the lower knife 5 the thicker sheet is cut because of the fact that according to experience the remainder of the thickness will break away after only partial penetration of the knife. If it is assumed that the sheet 25 in FIGURE 1 is the thinnest thickness, and that the cutting edge of the lower knife 5 rolls off just on the level of the cutting edge of the upper knife 4 which would amount to a zero overlap of the knife there is produced during the cutting of thicker sheets of necessity a "negative" knife overlap, i.e. the lower knife 5 no longer meets the upwardly displaced upper knife 4 so that the cut sheet edges are rarely bent.

The invention is also directed to the further improvement and adjustment of cutting drives which are independent from each other on the sides of the requirements of shears having a curved knife which is to be moved in a cradle cut. It is known to provide hydraulic cutting drives in order to be able to adjust by unilateral lowering of the knife support before the cutting action any desired cutting angle. During cutting the hydraulic single drives are operated in parallel. In contrast to this the invention provides a control for the two hydraulic adjusting motors 12, 13 by which after an unilateral partial cutting by the curved lower knife 5 the two adjusting motors are coupled during the cradle cut by a hydraulic linkage so as to move in opposite directions. This eliminates controlling the two adjusting motors from synchronously operating control pumps in order to obtain a prescribed cradle movement so that the hydraulic mechanism is substantially simplified.

Figures 2, 3, 4, 5, 6, 7:
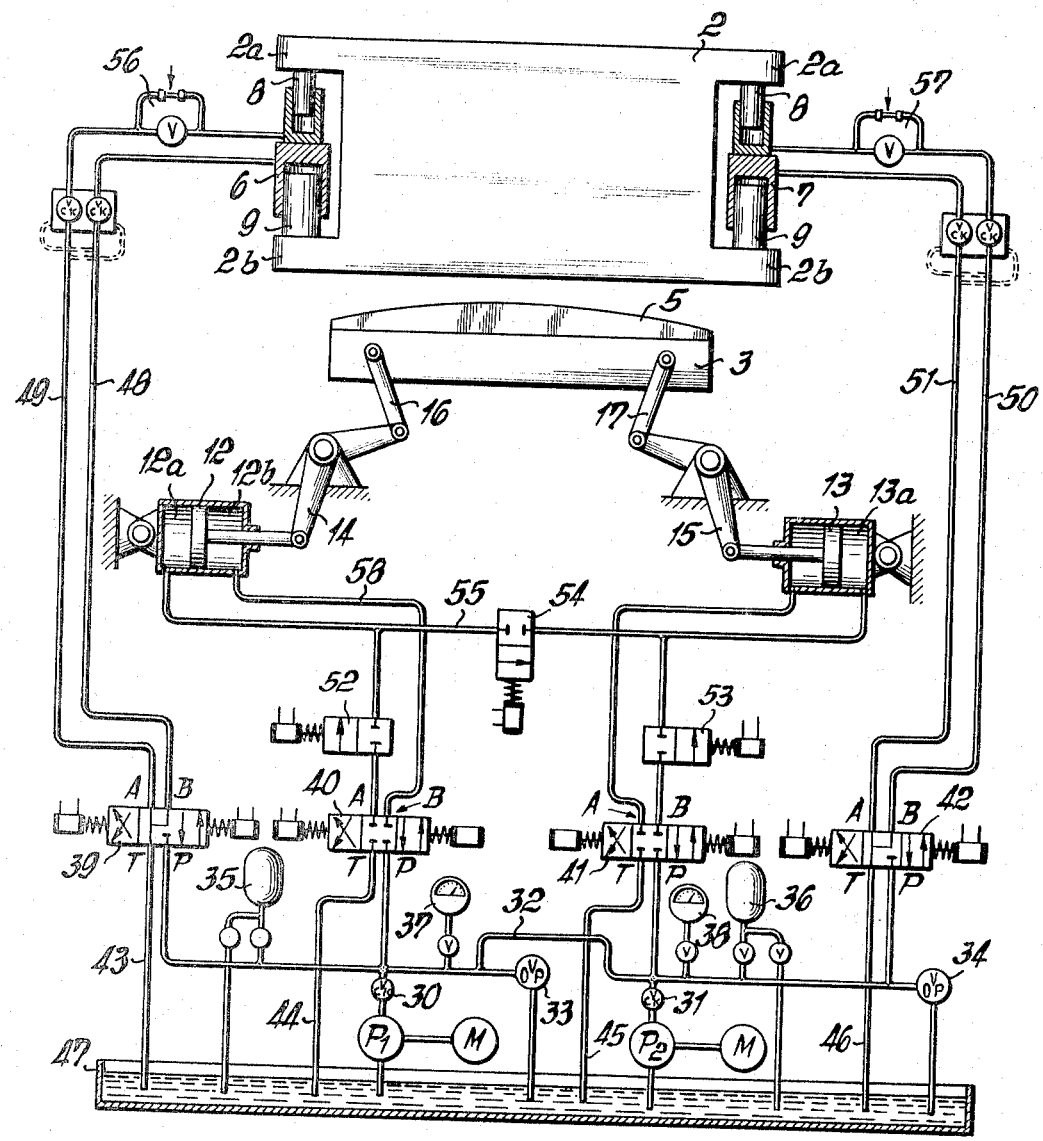
FIG. 2 is a diagram of the hydraulic control.
FIGS. 3 to 7 illustrate different knife positions during a cutting process.

The hydraulic control is illustrated in greater detail in FIGURE 2. Two simple, non-regulated oil pumps P1 and P2 feed each over a check valve 30, 31 into a common pressure line 32 in which a constant pressure is maintained by over-pressure control valves 33, 34. Equalization containers 35, 36 which are fed by air pressure and manometers 37, 38 are connected to the pressure line 32. To the pressure line 32 are also connected four magnetic valves 39–42. The return lines 43–46 lead from these valves to the storage tank 47.

The valves 39 and 42 control over lines 48, 49 or 50, 51 the cylinder units 6, 7 for the height adjustment of the upper knife support 2. Valves 40, 41 serve in cooperation with magnetic valves 52, 53 connected thereafter to provide a random actuation of the adjusting motors 12, 13. The additional magnetic valve 34 in the connecting line 55 between the functionally corresponding pressure chambers 12a and 13a of the adjusting motors 12, 13 is provided for the purpose of producing the hydraulic linkage between the two adjusting motors so as to allow them to operate exactly in opposition during the cradle cut. The operation in opposite directions means here that the one adjusting motor lowers the lower knife support 3 while the other one raises it on its connection side. The operation and valving sequence of the hydraulic control according to FIGURE 2 for a cut from left to right according to FIGURES 3 through 7 is explained hereafter, wherein the actuation of the valves 39 through 42 is illustrated by the letters A, B, T and P for the inlets and outlets designating the connection of the passage. The other valves 52 through 54 are open only when they are "excited." In order to move from the neutral center position shown in FIGURE 2 into the starting position of FIGURE 3 the valves 40, 41 are switched to PA, AT and the valves 52, 53 are excited. In this way the lower knife support 3 is raised by the adjusting motor 12 and is lowered on the other side by the adjusting motor 13 without impeding the free input of a sheet 25 (FIGURE 3). After this all the valves are again without current.

When a cut is to be carried out, first the upper knife support 2 is lowered just above the sheet 25 into the position of FIGURE 4. Valve 39 is now switched to PB, AT and valve 42 to PA, BT. In view of the fact that into the lines 49 and 51 serving as return flow lines volume flow valves 56, 57 are connected, a parallel movement of the two parallel piston sets 8, 9 is assured.

For starting the cut the curved lower knife must be raised by the adjusting motor 12 on the left side (FIG. 5). For this purpose valve 40 is switched to PA, BT and valve 52 is excited.

From the start of the cut the cradle cut begins in that the cutting edge of the lower knife 5 rolls off on the cutting edge of the upper knife 4 in the case where the sheet has the smallest thickness. When the thickness is larger the upper knife 4 is set to a higher level, but the rolling movement of the lower knife 5 remains on the same horizontal line so that the knives do not touch during the cutting action.

During the cradle cut the circuit connection is as follows: Valve 40 to PB, AT; valve 41 to PB, AT, valve 54 excited. The pressure goes from valve 40 over line 58 to the pressure chamber 12b of the adjusting motor 12, which operates to lower the lower knife 5. The oil displaced from pressure chamber 12a cannot flow over valve 40 to the return flow line 44, as valve 52 prevents the return flow. The displaced oil may flow over the open valve 54 to the pressure chamber 13a of the adjusting motor 13 and acts against its piston so that the lower knife 5 is raised on the right side. The oil displaced from pressure 13b flows off through valve 41 and the return flow line 45 while line 55 is closed by the closed valve 53 with respect to the pressure line 32 although valve 41 is actually open through PB. In this manner a hydraulic linkage is obtained in a simple manner by opposite connection of the lines 55 leading to the functionally corresponding pressure chambers 12a and 13a and by simultaneous closing of these lines against the return flow and the pressure source.

After the completed cradle cut (FIGURE 6) the upper knife 4 is raised again and the lower knife 5 is lowered on the right side (FIGURE 7) in order to release the sheet. The connection for this is as follows: Valve 39 to PA, BT, valve 41 to PA, BT, valve 42 to PB, AT, valve 53 excited. The next cut may now take place from right to left in that the valves 39 through 42 are appropriately not connected in the other direction. When the next cut is to be carried out again from left to right the connection must be made to "cradle cut" according to the knife position of FIGURE 7 whereby the starting position according to FIGURE 3 is obtained.

The shears of the invention is unusual also due to its small height. This is provided by the cutting drive over the angle levers 14, 15 in that the hydraulic adjusting motors 12, 13 may be arranged horizontally. Furthermore the intermediate connection of the angle levers 14, 15 between the adjusting motors 12, 13 and the pressure rams 16, 17 has the purpose of converting the uniform movement of the piston rods of the adjusting motors over crank gears into a displacement of the pressure rams 16, 17 following the sine law in the sense that during the cradle cut one side of the curved knife returns with an acceleration and the other side moves upwardly with a retardation whereby the rolling off of the curved knife 5 on a horizontal line and thus a uniform penetration depth of this knife over the entire sheet width is assured. Due to the adjustability of the straight upper knife 4 in adapting it to the different sheet thicknesses the play of movement of the lower knife 5 relative to the stroke and cradle cut may be maintained always equal without creating a variation in the cutting angle at the start as well as in the further course of the cutting conditions. This produces with a very simple control of the separate cutting drives the possibility of employing shears with a curved cradle knife for cutting sheets of very different thicknesses.

Instead of determining the stroke and cradle movement of the lower knife 5 which could be obtained for example by terminal switches at the upper knife support 2 it lies within the scope of the invention to adapt with more refined hydraulic controls or also with laterally separate mechanical cutting drives the cutting conditions by stroke displacement or parallel displacement of lower knife 5 to varying sheet thicknesses and thus eliminate the height adjustment of the upper knife 4. With reference to the cutting course of FIGURES 3 through 7 the lower knife 5 would have to be lifted from the position of FIGURE 3 with a stationary upper knife 4 first parallel to itself into the relative position to the upper knife according to FIGURE 4. Thereafter follows as already described, the starting cut according to FIGURE 5, the cradle cut through FIGURE 6 and the return pull according to FIGURE 7 wherein again a stroke displacement of the lower knife downwardly is added in order to return to the starting position. In this process the sheet 25, which is a thin sheet and which lies in FIGURE 3 on the roller track, is lifted relatively strongly by the lower knife 5 while a thicker sheet is lifted less. Therefore, shears according to FIGURE 1 with height adjustable upper knife 4 is preferable with substantially varying sheet thicknesses because here the lifting of the sheet from the track may be adjusted, depending on the adjustment of the upper knife, to a very small amount.

In the shears according to FIGURE 8 the upper knife support 200 is slideably mounted in the columns 1a and 1b of the frame. The lower knife support 300 is stationary. The upper knife 400 is curved and lower knife 500 is straight.

In order to set the upper knife 400 to a rolling motion which is as straight as possible the upper knife support 200 is guided on one side in a rigid guide 220 which is inclined in the direction of the cutting plane and which is supported by the column 1b of the frame. On the other side an inclined guide 223 is mounted pivotably at 224 in the column 1a, the guide 223 yielding against a residually acting return force of a hydraulic cylinder 60 with a piston rod 61 during the cutting movements of the upper knife support 200. Due to this and because the horizontal component of the cutting force is directed to the rigid guide 220 the two guide rollers 62, 63 of the upper knife support 200 are always in contact with their guides 200 and 223.

A lower crank shaft 64 with the crank pins 64a and 64b provides the movement of the upper knife support 200 and tension rods 65, 66 respectively are mounted on the crank pins. The tension rods engage at their upper ends the two pins 67a and 67b of a common shaft 67 mounted in upper knife support 200. According to the invention the tension rod eyes 65a, 65b and 66a, 66b are mounted pivotably on one side at the crank shaft pins 64a, 64b and on the other side at the pins 67a, 67b of the common shaft 67 designed as an eccentric shaft, the eccentric shaft 67 being driven so that it may rotate and that it may also be locked.

The pivotal connection of the tension rods 65, 66 was provided with respect to the cradle cutting movements of the upper knife support 200. The eccentric shaft 67 with its eccentric pins 67a, 67b which is driven rotatably in a self locking manner over a worm gear drive 69, 70 arranged in the upper knife support 200 serves for the stroke displacement of the upper knife 400 relative to the stationary straight lower knife 500. This construction is known in flying shears as miscut control but in that case the eccentric shaft is abruptly displaced between two dead center point positions of the eccentricity position in order to displace the stroke of one knife to a distance from the other one in which no longer any cuts may be carried out. This principle is employed within the scope of the invention for adjustable stroke displacements in order to be able to adjust the cutting angle of the curved upper knife 400 to changing sheet thicknesses.

The rolling cut shears illustrated in FIGURE 9 has two rams 72, 73 for the drive of the upper knife support 71 which are mounted in the frame and are moved by two parallel crank shafts 74, 75. At the frame are arranged again a rigid inclined guide 220 and a yielding guide 223 for the rollers 62, 63 mounted in the upper knife support 71. The rigid guide 220 is curved in the embodiment of FIGURE 9 so as to correspond to the course of the cycloids described by the momentary contact point between the roller 63 and the guide 220 in case the curved upper knife 401 would roll off on a straight line. This rolling off is therefore positively provided by the form of the guide 220.

In the shears according to FIGURE 9 the frame is subdivided into the upper part 76 which receives the entire cutting part and into the lower part 77 with the lower knife 501. For the stroke displacement the upper part is displaceable in height relative to the point 77 associated with the lower knife 501 together with the cutting drive 72 to 75. For this purpose the shears are designed similar to the case of roller straightening machines in two parts with four tie rods 78 connecting the frame parts 76, 77, the tie rods cooperating each with a setting device as may be seen on a larger scale in FIGURE 10.

Each tie rod 78 has at the upper end a screw part 78a with a pressure nut 79 provided with worm gear teeth 79a into which a worm 80 meshes. All the worms 80 are driven together by a motor over a conventional drive and over connecting shafts. In the end of each tension rod 78 a pin 81 is fixed as guide for a package of plate springs 82 which act upon an adjustable abutment 84 threaded into a closure member 83 and pulling the upper part 76 of the frame upwardly against the pressure nut 79. This type of balancing is also known in straightening machines.

When the open interval of the tie rods 78 transversely of the knives 401 and 501 is made large enough the rolling cut shears of FIGURE 9 may be employed as splitting shears in shearing lines because due to the stroke displacement of the invention the knife movement may be so set that no overcutting of the knives is produced and a deformation of the cut sheet edges is avoided.

It may further be seen from FIGURE 9 that the upper knife 401 extends with its cutting edge at the left end which opposes the sheet advance during the application as splitting shears more in the rearward direction with respect to the knife curvature. This is necessary so that the end of the upper knife remains at the end of the cradle cutting movement outside of the thickest sheets to be handled.

What is claimed is:

1. Heavy duty shears for shearing metal plates comprising a housing, an upper knife support carried in said housing, an upper cutting knife mounted on said upper knife support, a lower knife support carried in said housing, a lower knife mounted on said lower knife support, one of said knives being straight and the other knife being curved, said knife support of said curved knife being guided on one side by an inclined rigid guide, two crank drive means operatively connected to the knife support at a distance from each other carrying said curved knife for imparting a reciprocating rocking movement to said knife support for effecting a cutting stroke in cooperation with said straight knife mounted in a relatively fixed position, and adjusting means for moving the level of one of said knives in a vertical direction normal to its original level and relative to said other knife without changing the cutting movement of said curved knife.

2. Heavy duty shears according to claim 1 wherein the knife support of the straight knife is adjustable to different levels.

3. Heavy duty shears according to claim 1 wherein the cutting drives of the curved knife are adjustable as a unit when the straight knife is stationary.

4. Heavy duty shears according to claim 3 wherein the knife support of the curved knife is guided on one side in an inclined rigid guide and on the other side in a guide mounted pivotably in the housing, said inclined rigid guide corresponding approximately to the cycloid curve described by the positively guided part of the knife support subject to a rolling-off of the curved knife on an imaginary horizontal line during the cutting operation.

5. Heavy duty shears according to claim 1 wherein the cutting drives are operable selectively either individually or together.

6. Heavy duty shears according to claim 5 having hydraulic cutting drives and including a control arrangement for the two hydraulic adjusting motors whereby after a unilateral starting cut of the curved knife the two adjusting motors are coupled in opposition through a hydraulic linkage during the cradle cut.

7. Heavy duty shears according to claim 6 wherein the two adjusting motors are disposed horizontally and are operably connected by a pair of angle levers to a pair of pressure rams for moving the curved knife during the cradle cut on one side downwardly with an acceleration and on the other side upwardly with a retardation.

8. Heavy duty shears according to claim 4 including a curved upper knife and an upper knife support driven by a lower crank shaft over tension rods wherein the tension rod eyes are pivotably mounted on one side at the crank shaft pins and on the other side at a common eccentric shaft mounted in the upper knife support, said eccentric shaft being rotatable and lockable in position.

9. Heavy duty shears according to claim 4 having a curved upper knife and two pressure rams mounted in the housing wherein the housing part carrying the cutting drives is displaceable in height together with the cutting drives relative to the housing part carrying the lower knife.

References Cited by the Examiner

UNITED STATES PATENTS

| 1,413,206 | 4/1922 | Tyler | 83—644 |
| 1,986,685 | 1/1935 | Soderberg | 83—644 |
| 2,922,458 | 1/1960 | Jensen | 83—644 X |

FOREIGN PATENTS

| 416,642 | 7/1925 | Germany. |
| 867,567 | 8/1941 | France. |
| 722,271 | 7/1942 | Germany. |
| 1,137,783 | 1/1957 | France. |
| 1,043,023 | 11/1958 | Germany. |
| 884,332 | 12/1961 | Great Britain. |
| 219,380 | 1/1962 | Austria. |

ANDREW R. JUHASZ, *Primary Examiner.*